United States Patent [19]
Schmidt

[11] 3,790,289
[45] Feb. 5, 1974

[54] GAS TURBIDITY MEASURING APPARATUS

[75] Inventor: Ulrich Schmidt, Bad Homburg, Germany

[73] Assignee: Robert Bosch GmbH, Stuttgart, Germany

[22] Filed: Feb. 5, 1973

[21] Appl. No.: 329,381

[30] Foreign Application Priority Data
Mar. 8, 1972 Germany............... P 22 11 073.2

[52] U.S. Cl.................... 356/205, 250/218, 350/62, 350/63, 356/207
[51] Int. Cl....................... G01n 21/22, G01n 21/12
[58] Field of Search .......... 356/201, 205, 207, 208; 350/62, 63; 250/218

[56] References Cited
UNITED STATES PATENTS
2,966,092  12/1960  Hartridge........................... 356/205

Primary Examiner—John K. Corbin
Assistant Examiner—V. P. McGraw
Attorney, Agent, or Firm—Flynn & Frishauf

[57] ABSTRACT

The turbidity of exhaust gases of an internal combustion engine is measured by comparing light transmission through the gases with light transmission through an equivalent body of clean air. In order to prevent accumulation of dirt or soot on the light source, photocell, and optical path element, a pair of transparent rotating discs is used to close off the opening through which light enters and leaves the test chamber, allowing a small gap for a laminar boundary layer of clean air. One of the discs has opaque sectors and functions also as a shutter, so that the light may pass alternately through the test chamber and through another chamber containing clean air.

29 Claims, 2 Drawing Figures

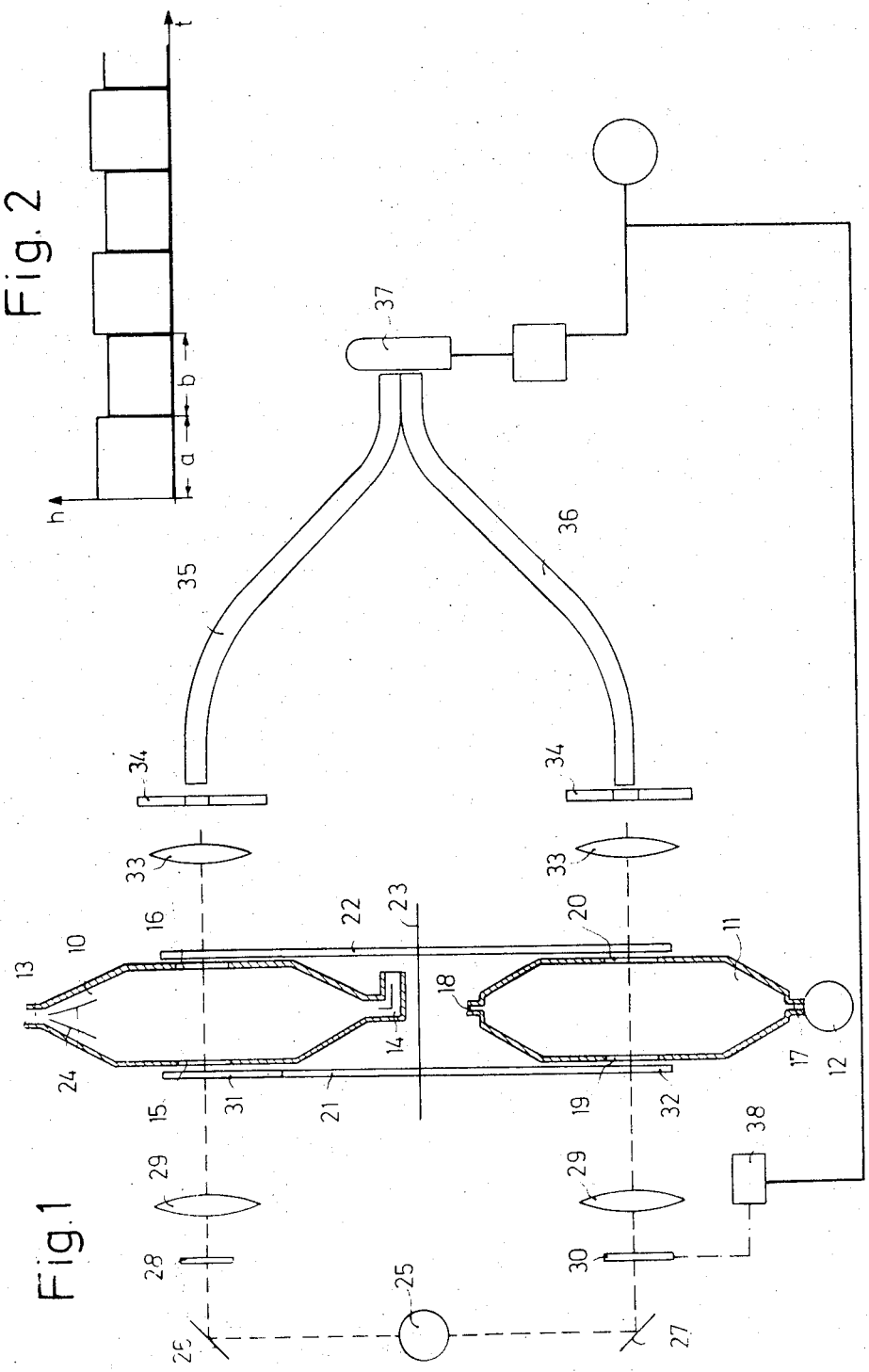

GAS TURBIDITY MEASURING APPARATUS

This invention relates to an apparatus for evaluating turbidity or clouding in gases, particularly in exhaust gases of Diesel motors, by the measurement of the intensity of a light beam which is caused to pass through a chamber filled with the gases to be measured.

The measurement of gas turbidity, particularly for exhaust gases from motor vehicle internal combustion engines, has the purpose of detecting turbidifying components in the waste gases. The principle of such turbidity measuring apparatus lies in varying the strength of illumination applied to a photocell placed at one end of a measuring tube when the light radiated from a light source, instead of shining through clean air, passes through turbid or smoky gas. The turbidity of the gases to be measured arises mainly from soot particles. The sooty gases flowing through the measuring tube very soon make a deposit on the surface of the light source and of the photocell on which they impinge. The measurement results thus become inexact, and sometimes measurement becomes quite impossible.

In order to keep the gases being measured away from the light source and the photocell, in apparatus heretofore known a clean air stream is blown transverse to the flow of the measuring gases by a special ventilator built into the apparatus, at the ends of the measuring tube which are located at a certain distance from the light source and the photocell, respectively. This air stream is intended to deflect the measuring gases away from contact with the light source and the photocell and thus keep clean the surfaces of the light source and of the photocell. In spite of this clean air stream across the flow of gases to be measured, a soiling of the surfaces of the photocell and of the light source still takes place after a while. The length of the column of gas being measured that is involved in the measurement, moreover, is affected by the clean air stream. In this fashion, a further distortion of the measurement results occurs. Besides, the output characteristic of the blower has an effect on the length of the column.

Since it is particularly difficult and expensive to blow a clean air stream of constant strength steadily past the light source and the photodiode, errors are introduced into the resulting measurements for this reason also.

The average temperature of the gases under measurement in the measuring apparatus, furthermore, also affect the measurement. When the known kinds of apparatus are used, the gas under measurement in the measuring tube is mixed at the end of the tube with the cleansing air passing across the tube end. An exact determination of the average temperature of the measuring gases is thus made more difficult, and the measurement is also impaired by this circumstance.

There is also an interaction of the pressure of the gases under measurement and that of the clean air being blown past at the end. It is, furthermore, important for the precision of the measurement that the photocell and the light source become warmer when the apparatus is used a long time, in spite of the clean air blown past these electrical components. In consequence, the sensitivity of the photocell changes. In this manner, also, substantial measurement errors arise. Finally, there is no linear relation between the strength of illumination applied to the photocell and the photocell output voltage, so that here again there are possible causes for mismeasurement.

Further measurement errors are possible on account of the fact that the light supplied by the light source and passing through the measuring tube is not focused into a beam. Reflections consequently occur at the walls of the measuring tube, which give rise to measurement errors. Still further measurement errors arise because the light in the measuring tube can be scattered by the soot particles which create the turbidity.

An object of the invention is to provide a turbidity measuring apparatus that is simple to build and simple in operation and is also capable of avoiding the above noted measurement errors.

SUBJECT MATTER OF THE PRESENT INVENTION:

Briefly, at the light inlet and light outlet sides or ends of the measurement chamber, rotating transparent discs are respectively provided to close off the openings and a boundary layer of clean air entrained by the discs at their surfaces prevents direct contact between the discs and the gases under examination, or at least reduces such direct contact to an acceptable minimum. The gap between the measuring chamber ends and the respectively adjacent discs approximately corresponds to the thickness of the clean air boundary layer, the gap width being approximately 0.2mm, but not exceeding 0.4mm.

Preferred features of the apparatus are the provision of the axis of rotation of the discs passing outside of the measurement chamber and disposition of the gas inlet and outlet of the measurement chamber so that the gases flow therethrough in a direction parallel to the surface of the discs and in their direction of rotation. In the neighborhood of the discs, the gases under measurement preferably move at the same speed as the discs.

A second measuring chamber filled with clean air may be provided, having similar openings bounded by the discs and preferably pumped to a pressure above atmospheric pressure. The measuring light beam in that case is split with one branch passing through the clean air chamber and the discs are preferably provided with opaque coated portions so disposed as alternately to block off first one branch and then the other of the split light beam. The combined cross section of the light beam or beams appearing at the exit side of the apparatus is preferably held constant.

The light passing through the chamber or chambers is preferably concentrated into a parallel or weakly convergent beam by a collimator. A diaphragm to limit the passage of light coming out of each collimator may be provided to assure that the two branch light beams are of the same size. A focusing lens is preferably used on the exit side of each chamber and a diaphragm may be used behind each focusing lens to find the size of the light spot projected to a common light sensitive element serving both branch beams. To conduct each branch light beam to the light sensitive element, optical fibers are preferably used. The regulation of light flowing through each chamber may be accomplished by the provision of polarization filters.

When monochromatic light is used, it is particularly effective to use light in the short-wave ultraviolet region. If light of a range of wave lengths is used, light similar to sunlight is desirable and it may be made to correspond to the sensitivity of the human eye by the use of filters.

The regulating device, such as the previously mentioned polarization filter, may in operation be so adjusted that the light received by the common photocell remains constant over the revolution of the discs, and an electrical indicator may advantageously be provided for detecting and indicating the position of the regulating device.

A temperature sensor may be provided to measure the average gas temperature. Fins may be placed in the chamber to promote an even distribution of the gases over the length of the chamber, finally, portions of the apparatus which guide the gases to be examined may be provided with tubing or other enclosed spaces for circulation of a heating or cooling medium between the apparatus proper and an outer cover.

The invention will be described by way of example with reference to the accompanying drawing, wherein:

FIG. 1 is a diagrammatic representation, with the measuring chambers in cross section, of a measuring apparatus according to the invention, and FIG. 2 is a graph of the change of voltage with time of the electrical output of a light sensor in the apparatus of FIG. 1.

The turbidity measuring apparatus shown has two cuvettes, a test cuvette 10 and a comparison cuvette 11. During the measurement procedure the gas to be measured, which may, for example, be piped to the test cuvette 10 from the exhaust system of an internal combustion engine, flows continuously through the test cuvette 10. The comparison cuvette 11, on the other hand, is connected to a pump 12 which continuously supplies clean air to it and maintains pressure level slightly above atmospheric pressure in this comparison cuvette 11.

In addition to the inlet 13 and the outlet 14 for the test gas, the test cuvette 10 has two further openings 15 and 16. The apperture 15 is the light inlet and the aperture 16 is the light outlet of the test cuvette 10. In practice, the flow direction of the gases through the cuvettes 10 and 11 is so chosen that it conforms with the direction of rotation of the discs 21 and 22, which cover the light openings 15 and 16. It has been found advantageous, furthermore, for the flow velocity of the gases, particularly that of the test gas, to correspond to the speed of the discs produced by their rotation.

The comparison cuvette 11 is in principle of the same form. It also has an air inlet 17, an air outlet 18, a light inlet 19 and a light outlet 20. The discs 21 and 22 are disposed adjacent to the openings 19 and 20 as well as to the openings 15 and 16. These discs 21 and 22 are mounted on a common shaft 23, which is rotatably driven by a motor not shown in the drawing. The discs are slightly spaced in front of the openings 15,16,19 and 20, so that a boundary layer of air on the disc surface may have a laminar flow past the openings without appreciably effecting the measuring length through the cuvettes 10 and 11. The thickness of the laminar boundary layer in this arrangement can vary in operation between almost 0 and 0.4mm. If the test cuvette has a length (in the direction of the axis of disc rotation) of 140mm, for example, the effect of the laminar boundary layer on the measurement length is extremely small. Since the test gases flow through the cuvette 10 perpendicularly to the longitudinal direction of the light beam, changes in the turbidity of the test gases can be quickly detected. Moreover, the temperature over the entire length of the test cuvette 10 is approximately the same. In addition, the average temperature of the test gases can be precisely determined by means of a bolometer resistance wire, not shown in the drawing, arranged to pass down the entire length of the test cuvette.

Guide fins 24 are provided at the gas inlet side of the test cuvette 10 for the purpose of producing an even distribution of the flow over the entire cuvette. Light beams from a light source 25 passes both through the test cuvette 10 and the comparison cuvette 11, directed through the cuvettes respectively by the deflection mirrors 26 and 27. In the light path between the light source 25 and the test cuvette 10, there are provided an interference type filter 28 and a lens system 29 for focusing the light beam. In the light path between the light source 25 and the comparison cuvette 11 are located a polarization type filter 30 and likewise a lens system 29 for focusing the light beam. In practice it is desirable for the light source 25 to be so constituted that it provides light similar to sunlight. However, when a short wave length polychromatic light source is used, it is appropriate to insert a filter in the light path which will pass only light in a narrow passband in the ultraviolet region.

The disc 21 has opaque sectors 31 and transparent sectors 32. The division of the disc into these sectors is so designed that when a opaque sector 31 passes by the opening 15, a transparent sector 32 goes by the opening 19 and vice versa. The exact distribution of transparent and opaque sectors of the disc 21 is so designed that when the disc 21 rotates the sum of the intensity of the light passing through the two cuvettes remains constant when both cuvettes are filled with clean air.

Behind the light exit window 16 of the test cuvette, a gathering lens system 33 is disposed, behind which an aperture diaphragm 34 is provided for exclusion of stray light. Simlarly, behind the opening 20 of the comparison cuvette 11 a gathering lens 33 is arranged behind which likewise an aperture diaphragm 34 is provided. Behind the aperture diaphragms 34, light conductors are disposed which lead the light to the light sensitive surface of a sensor 37. This sensor 37 preferably so made that its color sensitivity corresponds, either as the result of its inherent properties or consequence of associated filters, to the color sensitivity of the human eye.

The operation of this measuring system is as follows:

The light source 25 radiates light which is focused by the lenses 29 and projected through the test cuvette 10 and the comparison cuvette 11. As shown in the drawing, when an opaque sector 31 of the disc 21 happens to be located in front of the opening 15 of the test cuvette 10, light cannot pass into or through the test cuvette 10. On the other hand, light passing over the deflection mirror 27, through the polarization filter 30 and focusing lens 29 can penetrate into the comparison cuvette 11 through the transparent sector 32 of the disc 21 and come out through the opening 20 and the disc 22. The light coming out of the opening 20 must pass through the focusing lens 32, the aperture diaphragm 34 and thence over the light conductor 36 to the light sensitive surface of the sensor 37. The output voltage of the sensor 37 in this condition is given by the curve $a$ in FIG. 2.

If now the discs 21 and 22 are rotated further, the transparent sector 32 of the disc 21 will come in front of the opening 15, while the opaque sector 31 of the disc 21 come in front of the opening 19 of comparison cuvette 11. Light can then no longer pass through the comparison cuvette 11, but it can now pass through the test cuvette 10. Here also this light is brought to the light sensitive surface of the sensor 37 through the focusing lenses 29 and 31 as well as the diaphragm 34 and the light conductor 35.

The output signal of the sensor 37 will then correspond with the curve *b* shown in FIG. 2, where the turbidity of the gases in the test cuvette 10 causes the light beam which falls upon the light sensitive surface of the sensor 37 to be weaker, so that the output signal corresponding to FIG. 2 is likewise smaller. If this output signal is now amplified and provided to an indicating device, the magnitude of the turbidity of the gas under measurement can be derived from the difference between the signals.

It has been found particularly advantageous if the polarization filter 30 in the light path between the light source 25 and the comparison cuvette 11 is rotated to such a point that it dims the light beam passing through the comparison cuvette until the light coming out of the test cuvette 10 and out of the comparison cuvette 11 has the same intensity. This is, therefore, the case when the sensor 37 produces a steady voltage, that is, when the voltages in the regions *a* and *b* are of the same magnitude. When the light beams are thus equalized, the angular position of the polarization filter 30 is a measurement of the turbidity of the gas flowing through the test cuvette 10. The scale of the polarization filter can therefore be calibrated directly in units that give the degree of turbidity of the test gas. The angular position of the polarization filter can also be taken off with an angular position transmitter providing a suitable electrical signal, whereby the magnitude in question can be indicated on an electrical indicator.

Another arrangement found particularly useful is the automatic control of the rotation of the polarization filter by means of a servo motor 38, which allows the time necessary for equalization of the light intensity to be substantially shortened and which also makes it possible to observe changes in the turbidity of the gas.

It has been found particularly helpful in the operation of the measuring apparatus described to supply the light beams passing through the cuvettes 10 and 11 from a common light source. The lens systems 29 and 32, as well as the diaphragms 34, make it possible to prevent recurrence of errors of measurement that may be caused by reflected light or stray light in the cuvettes 10 and 11. In addition, it has been found particularly advantageous to direct the light conducting fibers 35 and 36 to deliver light on a common light sensitive surface of a photocell, so that errors that might arise from different characteristics of two different sensors can be excluded.

By means of the rotating discs 21 and 22, it is assured that there will be no contamination of the light source 25 or of the sensor 37. This arrangement is also capable of preventing the warming up of the light sensitive sensor 37, because the spacing away of this sensor from the test cuvette 10 that warms up considerably during the measuring process provides desirable isolation. It is particularly helpful if the piping leading the exhaust gases to the test cuvette 10 are well insulated for heat, so that temperature changes of the test gas are quickly carried over to the test cuvette.

The interference filter 28, ahead of the light input to the test cuvette 10, makes it possible to make sure, by way of calibration, that when both cuvettes are filled with clean air, the light beams through the two cuvettes are of the same intensity. In this case, the photocell continuously receives the same illumination intensity, independently of the instantaneous position of the partly transparent and partly opaque rotating disc 21.

If then turbid gas is sent through the test cuvette, the illumination intensity of the photocell drops off while the light passes through the test cuvette 10. An alternating voltage is thereby superimposed on the d.c. voltage delivered by the photocell. If now the alternating voltage is brought to 0 by rotating the adjustment of the polarization filter, a measure of the turbidity of the test gas can be derived from the rotation of the polarization filter, as already mentioned.

In order to increase the resolution of the measuring apparatus, the rotational speed of the shutter disc 21 can be increased and the number of sectors of the shutter can likewise be raised. The resolution is then dependent in practice only upon the lag in response of the particular sensor 37 that is used.

If very quickly changing processes are to be oscillographically observed with the apparatus of this invention, the adjustable polarization filter ahead of the comparison cuvette can no longer serve for the observation. Instead, the voltage change detected by the light sensitive sensor must be directly observed with a suitable filter in place of the polarization filter.

When monochromatic light is used for turbidity measurement, it is possible to detect not merely the turbidity, but rather the content in grams per cubic meter of particular clouding materials. By the use of monochromatic light of suitable wave length, the influence of the soot particle size on the measurement results can be excluded. A simplified embodiment of the turbidity measuring apparatus can be constructed in which only the test cuvette 10 is present, in which case the light beam coming out of this test cuvette is compared with a fixed value of intensity which corresponds to the effect of passing light through clean air in the apparatus.

It can also be useful to cool or to heat the test gases. For this purpose, the components of the apparatus guiding the test gases may be surrounded with a shell or housing so arranged that a heating or cooling medium may be circulated between the shell and the aforesaid portions of the apparatus supplying the test gases.

I claim:

1. Apparatus for evaluating turbidity in gases, such as exhaust gases of diesel motors, by measuring the attenuation of a light beam passing through a chamber filled with the gas to be measured, comprising:
   a pair of rotationally driven transparent discs disposed on opposite ends of said chamber closely adjacent openings in said chamber facing said discs through which said light beam passes in, at one end, and out, at the other end, so that said discs close off said chamber in such a manner that a boundary layer of clean air entrained by said discs on their surfaces acts to prevent, or to reduce greatly, direct conact between said discs (21,22) and the said gases to be examined.

2. Apparatus as defined in claim 1 in which a gap is provided between the respective ends of the chamber (10) and the facing surfaces of said discs (21,22) which approximately corresponds to the thickness of said clean air boundary layer and has a gap width of approximately 0.2 mm, but not exceeding 0.4 mm.

3. Apparatus as defined in claim 1 in which the axis of rotation (23) of said discs (21,22) passes outside of said chamber (10) through which said gases flow.

4. Apparatus as defined in claim 3 in which said gases flow through said chamber (10) in a direction parallel to the surface of said discs (21,22) and in their direction of rotation.

5. Apparatus as defined in claim 4 in which the velocity of flow of said gases is approximately equal to the velocity of rotation of said discs (21,22) in the neighborhood of said openings of said chamber (10).

6. Apparatus as defined in claim 4 in which a second measuring chamber (11) filled with clean air is arranged parallel to the aforesaid chamber (10) through which flow the gases to be examined.

7. Apparatus as defined in claim 6 in which said second chamber (11) is bounded at its ends by the same transparent and rotating discs (21,22) as said first mentioned chamber (10), 8. Apparatus as defined in claim 7 in which said second chamber (11) filled with clean air is subjected to a pressure above atmospheric pressure by means of a pump (12).

9. Apparatus as defined in claim 6 in which said second chamber (11) is closed off on all sides.

10. Apparatus as defined in claim 6 in which a light beam is passed through said second chamber (11) coming from the same source (25) which provides the light beam passing through said first mentioned chamber (10).

11. Apparatus as defined in claim 10 in which at least one of said two rotationally driven transparent discs (21,22) is partly covered with opaque material in such a way that as the result of rotation of said discs, the light beams passing through said chambers (10,11) are alternately blocked off and the aggregate cross section of the two light beams remains constant.

12. Apparatus as defined in claim 11 in which the light which passes through said chambers (10,11) is in each case concentrated into a parallel or weakly convergent beam by a collimator.

13. Apparatus as defined in claim 12 in which the path of light prior to reaching each of the said chambers (10,11) is controlled by a diaphragm, which limits the passage of light coming out of each of said collimators to a light beam of the same magnitude.

14. Apparatus as defined in claim 13 in which the light coming out of each of said chambers (10,11) is gathered in each case by a lens (33).

15. Apparatus as defined in claim 14 in which a diaphragm is provided behind each of said gathering lenses (33).

16. Apparatus as defined in claim 15 in which an optical device is provided behind each of said diaphragms on the exit side of said light beams, which is adapted to project the diaphragm openings onto a common light sensitive element.

17. Apparatus as defined in claim 16 in which the light gathered by said lenses is in each case transmitted by an optical fiber (35,36) onto a final cross sectional surface which corresponds to the cross section of the combined light beam.

18. Apparatus as defined in claim 17 in which the path of light through each of said chambers (10,11) passes in each case through a polarization filter, which makes possible the regulation of the light flowing through each of said chambers (10,11) to any desired degree.

19. Apparatus as defined in claim 10 in which said light source (25) delivers light similar to sunlight.

20. Apparatus as defined in claim 16 in which the color sensitivity of said light sensitive device (37) is made to correspond to that of the human eye in its response properties either directly or by the interposition of suitable color filters.

21. Apparatus as defined in claim 10 in which said light source (25) provides monochromatic light.

22. Apparatus as defined in claim 21 in which said light source (25) provides light in the short wave ultraviolet region.

23. Apparatus as defined in claim 10 in which said light source provides heterochromatic light and in which a filter is used in the path of said light which allows only a light of a narrow range of wave lengths in the ultraviolet region to pass.

24. Apparatus as defined in claim 10 in which a regulating device is interposed in the path of light which is passed through said second chamber (11) filled with clean air, said regulating device being provided with means for reading off its position at any time.

25. Apparatus as defined in claim 24 in which said regulating device is adjustable by automatically operative means (38) in such a manner that illumination of said light sensitive device (37) through said two chambers together remains constant during rotation of said discs (21,22).

26. Apparatus as defined in claim 25 in which an electrical indicator is provided for detecting and indicating the position of said regulating device.

27. Apparatus as defined in claim 6 in which said chamber (10) filled with said gases to be examined is provided with a temperature sensor for measuring the average gas temperature.

28. Apparatus as defined in claim 5 in which guide vanes are provided at the entrance end of said chamber (10) through which said gases to be examined flow, which vanes are adapted to promote even distribution of said gases over the length of said chamber.

29. Apparatus as defined in claim 28 in which the portions of the apparatus which guide the gases to be examined are at least in part surrounded by a covering and that the space between these portions and said covering are arranged to provide for the passage therethrough of a heating or cooling medium.

* * * * *